(12) United States Patent
Matsushima

(10) Patent No.: US 10,668,970 B2
(45) Date of Patent: Jun. 2, 2020

(54) SADDLE RIDING VEHICLE

(71) Applicant: HONDA MOTOR CO., LTD., Tokyo (JP)

(72) Inventor: Satoshi Matsushima, Wako (JP)

(73) Assignee: HONDA MOTOR COMPANY, Tokyo (JP)

( * ) Notice: Subject to any disclaimer, the term of this patent is extended or adjusted under 35 U.S.C. 154(b) by 0 days.

(21) Appl. No.: 16/257,308

(22) Filed: Jan. 25, 2019

(65) Prior Publication Data

US 2019/0248436 A1   Aug. 15, 2019

(30) Foreign Application Priority Data

Feb. 13, 2018   (JP) .................................. 2018-023337

(51) Int. Cl.
| | |
|---|---|
| *B62J 35/00* | (2006.01) |
| *B62J 37/00* | (2006.01) |
| *B62J 23/00* | (2006.01) |
| *B60K 15/073* | (2006.01) |
| *B60K 15/04* | (2006.01) |
| *F02M 37/00* | (2006.01) |
| *B60K 15/03* | (2006.01) |

(52) U.S. Cl.
CPC .............. *B62J 35/00* (2013.01); *B60K 15/04* (2013.01); *B60K 15/073* (2013.01); *B62J 23/00* (2013.01); *B62J 37/00* (2013.01); *F02M 37/007* (2013.01); *F02M 37/0076* (2013.01); *B60K 2015/03394* (2013.01); *B60K 2015/047* (2013.01); *B60K 2015/0432* (2013.01); *B60K 2015/0458* (2013.01); *B60K 2015/0474* (2013.01); *B60Y 2200/12* (2013.01)

(58) Field of Classification Search
CPC .................................. B62J 35/00; B62J 37/00
See application file for complete search history.

(56) References Cited

U.S. PATENT DOCUMENTS

| | | | | |
|---|---|---|---|---|
| 6,213,514 | B1 * | 4/2001 | Natsume ................... | B62J 35/00 280/833 |
| 6,655,363 | B2 * | 12/2003 | Kobayashi ............... | B62J 35/00 123/509 |
| 8,016,321 | B2 * | 9/2011 | Shimomura ............. | B62J 35/00 280/830 |
| 8,973,948 | B2 * | 3/2015 | Kanai ...................... | B62J 35/00 180/219 |

(Continued)

FOREIGN PATENT DOCUMENTS

| | | |
|---|---|---|
| JP | 2009-161017 | 7/2009 |
| WO | 2017/134834 A1 | 8/2017 |

OTHER PUBLICATIONS

European Search Report dated Jul. 2, 2019, 7 pages.

*Primary Examiner* — Brian L Swenson
(74) *Attorney, Agent, or Firm* — Rankin, Hill & Clark LLP

(57) ABSTRACT

A saddle riding vehicle includes: a fuel tank supported by a body frame; a filler opening provided in an upper surface of the fuel tank; a tank cover covering the upper surface of the fuel tank; and a fuel sump collecting fuel overflowing from the filler opening. The saddle riding vehicle includes a shroud covering a side surface of the fuel tank. The fuel sump is placed around the filler opening and under the tank cover. The fuel sump includes a drain pipe discharging fuel downward. The drain pipe extends between the tank cover and the shroud.

10 Claims, 12 Drawing Sheets

(56) References Cited

U.S. PATENT DOCUMENTS

| | | |
|---|---|---|
| 9,630,673 B2 * | 4/2017 | Kono ................. B62J 35/00 |
| 9,944,342 B2 * | 4/2018 | Hirano ............ B60K 15/067 |
| 10,328,985 B2 * | 6/2019 | Saito .............. B60K 15/0406 |
| 2009/0166364 A1 | 7/2009 | Shimomura |
| 2010/0242925 A1 * | 9/2010 | Yoshida ............... B62J 37/00 |
| | | 123/519 |
| 2010/0243355 A1 * | 9/2010 | Hosoya ............... B62J 37/00 |
| | | 180/69.4 |
| 2015/0053495 A1 * | 2/2015 | Nishida ............... B62J 37/00 |
| | | 180/219 |

* cited by examiner

SADDLE RIDING VEHICLE

INCORPORATION BY REFERENCE

The present application claims priority under 35 U.S.C. § 119 to Japanese Patent Application No. 2018-023337 filed on Feb. 13, 2018. The content of the application is incorporated herein by reference in its entirety.

TECHNICAL FIELD

The present invention relates to a saddle riding vehicle.

BACKGROUND ART

Some saddle riding vehicles conventionally known include: a fuel sump placed on a fuel tank; a drain pipe (fuel pipe) mounted to the fuel sump; and a tank cover which covers the fuel tank and the drain pipe (see, e.g., Patent Literature 1). In Patent Literature 1, an upper portion of the drain pipe is hidden by the tank cover, and a lower portion of the drain pipe is hidden by a shroud that is located below the fuel tank.

CITATION LIST

Patent Literature

[Patent Literature] JP-A No. 2009-161017

SUMMARY OF INVENTION

Technical Problem

And, the saddle riding vehicles are desired to have a simple structure to hide the drain pipe of the fuel sump in order to enable enhancement in external appearance.

The present invention has been made in view of the above circumstances, and an object of the present invention is to provide a saddle riding vehicle with a drain pipe of a fuel sump hidden by a simple structure in order to achieve enhanced exterior appearance.

Solution to Problem

A first aspect of the present invention provides a saddle riding vehicle including: a fuel tank (40) that is supported by a body frame (F); a filler opening (63) that is provided in an upper surface of the fuel tank (40); a tank cover (45) that covers the upper surface of the fuel tank (40); and a fuel sump (65) that collects fuel overflowing from the filler opening (63). The saddle riding vehicle includes a shroud (52) that covers a side surface of the fuel tank (40). The fuel sump (65) is placed around the filler opening (63) and under the tank cover (45). The fuel sump (65) includes a drain pipe (101) that discharges fuel downward. The drain pipe (101) extends between the tank cover (45) and the shroud (52).

Further, in a second aspect of the present invention, the tank cover (45) may include an overlap portion (45c) that is covered from outside a vehicle body with the shroud (52). The drain pipe (101) may pass through an opening (114) that is formed in the overlap portion (45c), and then the drain pipe (101) may extend between the tank cover (45) and the shroud (52).

Further, in a third aspect of the present invention, the drain pipe (101) may have an outlet (101b) placed between the tank cover (45) and the shroud (52).

Further, in a fourth aspect of the present invention, the tank cover (45) may include a guide (115) extending toward a side of the shroud (52), and the guide (115) may overlap the outlet (101b) from below.

Further, in a fifth aspect of the present invention, the shroud (52) may include a rib (117) extending toward an inside of the vehicle body, and the rib (117) may be located under the drain pipe (101).

Further, in a sixth aspect of the present invention, the guide (115) may have an outer end (118a) located more outward in a vehicle width direction than an inner edge (117a) of the rib (117).

Further, in a seventh aspect of the present invention, the tank cover (45) may be co-clamped to a stay (73) through which a front end portion of the fuel tank (40) is secured to the body frame (F), and the tank cover (45) may have a rear end portion covered from above with a seat (13) for an occupant.

Further, in an eighth aspect of the present invention, the fuel sump (65) may have a front end portion secured to the upper surface of the fuel tank (40), and the fuel sump (65) may have a rear end portion held between the tank cover (45) and the upper surface of the fuel tank (40).

Further, in a ninth aspect of the present invention, the fuel tank (40) may have an upper half (67) and a lower half (68) joined together at a flange (71), the flange (71) protruding toward the outside of the fuel tank (40). The drain pipe (101) may be placed above the flange (71).

Advantageous Effects of Invention

With the saddle riding vehicle according to the first aspect of the present invention, the saddle riding vehicle includes: a fuel tank that is supported by a body frame; a filler opening that is provided in an upper surface of the fuel tank; a tank cover that covers the upper surface of the fuel tank; a fuel sump that collects fuel overflowing from the filler opening; and a shroud that covers a side surface of the fuel tank. The fuel sump is placed around the filler opening and under the tank cover. The fuel sump includes a drain pipe that discharges fuel downward. The drain pipe extends between the tank cover and the shroud.

With this configuration, the drain pipe of the fuel sump is hidden between the tank cover that covers the upper surface of the fuel tank and the shroud that covers the side surface of the fuel tank. Because of this, the drain pipe can be hidden by a simple structure to enhance exterior appearance.

Further, in the second aspect of the present invention, the tank cover may include an overlap portion that is covered from outside the vehicle body with the shroud. The drain pipe may pass through an opening that is formed in the overlap portion, and then the drain pipe may extend between the tank cover and the shroud. With this configuration, the drain pipe can be held and positioned by virtue of the opening which is formed in the overlap portion.

Also, in the third aspect of the present invention, the drain pipe may have an outlet placed between the tank cover and the shroud. With this configuration, the outlet of the drain pipe is hidden between the tank cover and the shroud. This provides fine exterior appearance. Also, since the entire drain pipe including the outlet can be housed in between the tank cover and the shroud, a reduced length of the drain pipe can be achieved.

Further, in the fourth aspect of the present invention, the tank cover may include a guide extending toward the shroud. The guide may overlap the outlet from below. With this configuration, the fuel drained from the outlet can be guided toward the shroud by the guide of the tank cover, so that the flow of fuel drained can be adjusted.

Further, in the fifth aspect of the present invention, the shroud may include a rib extending toward the inside of the vehicle body. The rib may be located under the drain pipe. With this configuration, the shroud can be reinforced by the rib, and the fuel drained from the outlet can be guided by the rib.

Further, in the sixth aspect of the present invention, the guide may have an outer end located more outward in a vehicle width direction than an inner edge of the rib. With this configuration, the fuel flowing downward from the tank cover guide can be received with efficiency by the rib of the shroud, so that the fuel discharge can be guided by the rib.

Further, in the seventh aspect of the present invention, the tank cover may be co-clamped to a stay through which a front end portion of the fuel tank is secured to the body frame, and the tank cover may have a rear end portion covered from above with an occupant seat. With this configuration, the seat and the stay for the fuel tank can be utilized to fix the tank cover in a simple structure.

Further, in the eighth aspect of the present invention, the fuel sump may have a front end portion secured to the upper surface of the fuel tank, and the fuel sump may have a rear end portion held between the tank cover and the upper surface of the fuel tank. With this configuration, the fuel sump can be secured to the fuel tank by a simple structure.

Further, in the ninth aspect of the present invention, the fuel tank may have an upper half and a lower half joined together at a flange which protrudes toward the outside of the fuel tank. The drain pipe may be placed above the flange. With this configuration, the drain pipe can be hidden from below by the flange of the fuel tank. Since the flange is also out of the way of the placement of the drain pipe, efficient placement of the drain pipe is provided.

DESCRIPTION OF EMBODIMENTS

Embodiments of the present invention will now be described with reference to the accompanying drawings. It is noted that, throughout the description, references to directions such as front, rear, left, right, upward and downward are made with reference to the vehicle body unless otherwise stated. Also, in each drawing, reference sign FR denotes the front of the vehicle body, reference sign UP denotes the upper side of the vehicle body and reference sign LH denotes the left of the vehicle body.

Figure 1:
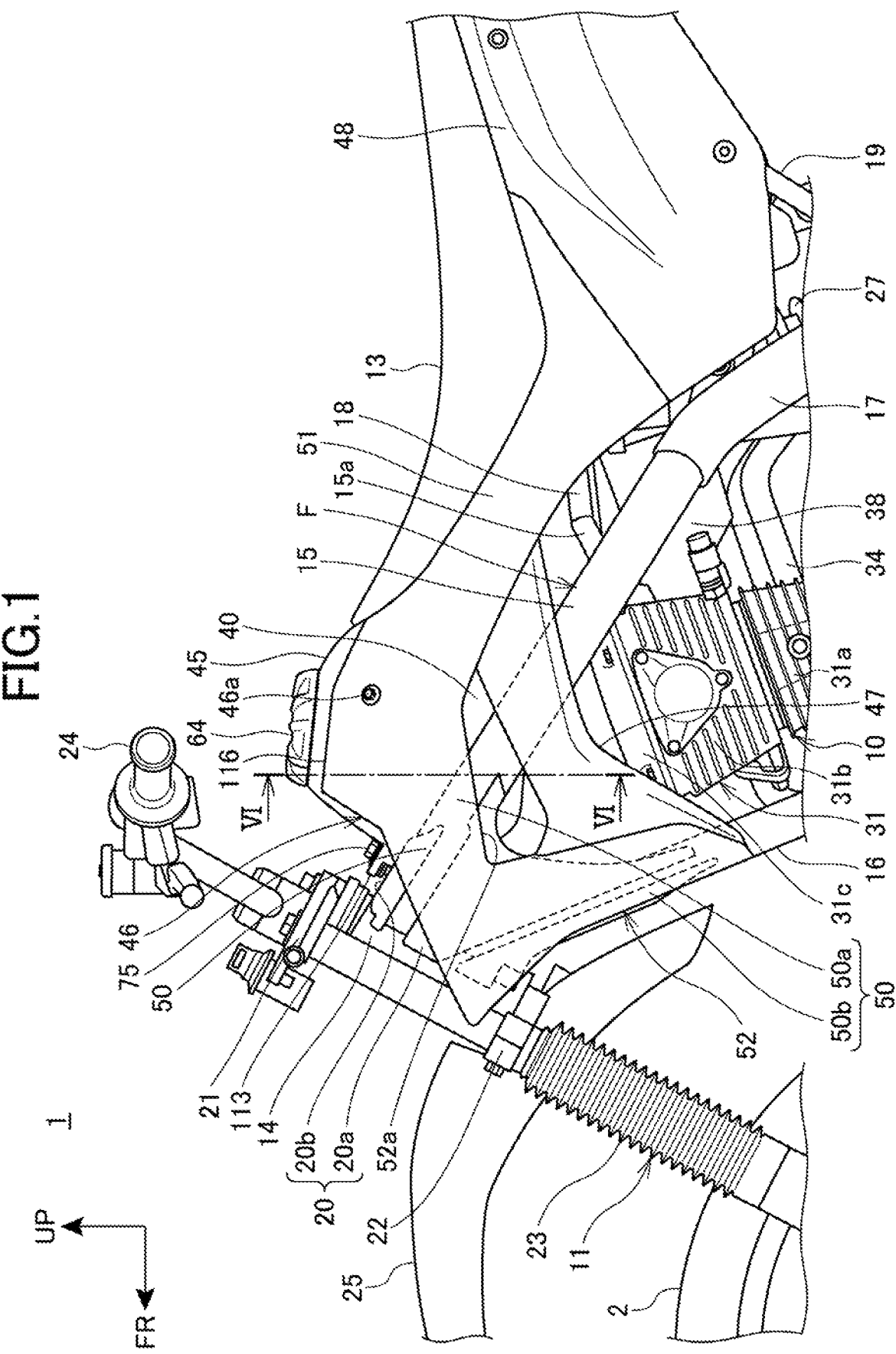
FIG. 1 is a left side view of an essential part of a motorcycle according to embodiments of the present invention.
Figure 2:
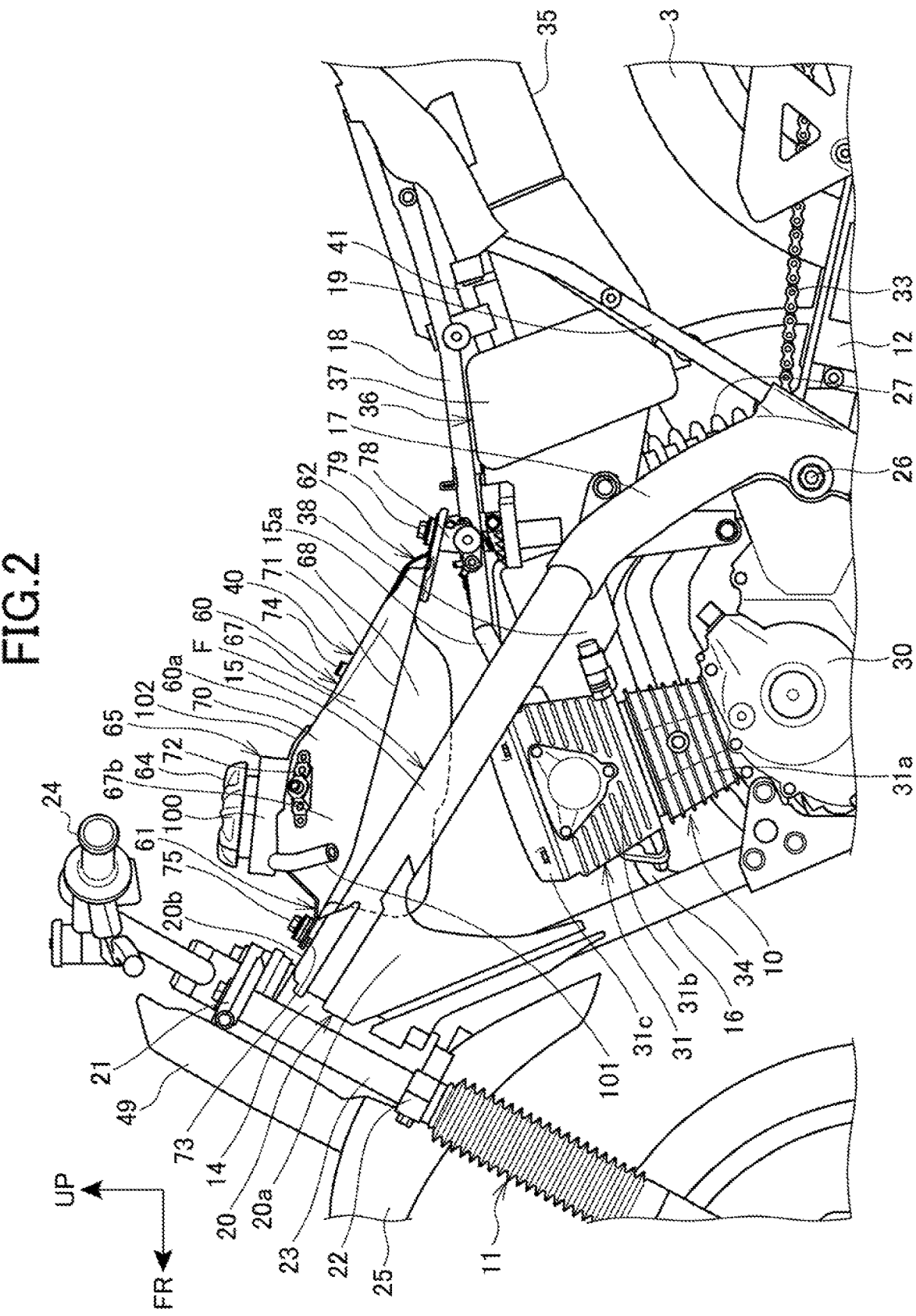
FIG. 2 is a left side view where a portion of a body cover, a seat and the like are removed.

FIG. 1 is a left side view of an essential part of a motorcycle 1 according to an embodiment of the present invention. FIG. 2 is a left side view where a portion of a body cover, a seat 13 and the like are removed. FIG. 1 and FIG. 2 shows only left one of each of components arranged in left-right pairs, and only a corresponding reference sign.

The motorcycle 1 is a vehicle in which: an engine 10 as a power unit is supported on a body frame F; a steering system 11 steerably supporting a front wheel 2 is steerably supported at a front end of the body frame F; and a swing arm 12 supporting a rear wheel 3 is installed in a rear portion of the body frame F. The motorcycle 1 is a saddle riding vehicle including a seat 13 mounted above a rear portion of the body frame F so that a rider sits astride the seat 13.

The body frame F includes a head pipe 14, a pair of left and right main frames 15, 15, a down frame 16, a pair of left and right center frames 17, 17, a pair of left and right seat frames 18, 18, a pair of subframes 19, 19, and a gusset 20.

The head pipe 14 is mounted to the front end of the body frame F and the head pipe 14 is located at the center in the vehicle width direction.

Each of the main frames 15, 15 extends rearward from the head pipe 14 in such a manner as to be inclined downwardly toward the rear. The main frames 15, 15 include a cross member 15a which couples rear portions of the respective main frames 15, 15 to each other in the vehicle width direction.

The down frame 16 extends downwardly toward the rear from a position below the main frames 15, 15 on the head pipe 14.

The center frames 17, 17 extend downward from rear end portions of the respective main frames 15, 15.

The seat frames 18, 18 extend rearward from the cross member 15a between the main frames 15, 15.

The subframes 19, 19 extend upwardly toward the rear from lower portions of the respective seat frames 18, 18 and then the subframes 19, 19 are connected to rear portions of the respective seat frames 18, 18.

The gusset 20 includes a side gusset 20a and a top gusset 20b, the side gusset 20a couples vertically front end portions of the main frames 15, 15 to a front end portion of the down frame 16, and the top gusset 20b couples the front end portions of the main frames 15, 15 to each other in the vehicle width direction (left-right direction).

The steering system 11 includes: a steering shaft (not shown) pivotally supported by the head pipe 14; a top bridge 21 secured to a top end of the steering shaft; a bottom bridge 22 secured to a bottom end of the steering shaft; a pair of left and right front forks 23, 23 supported by the top bridge 21 and the bottom bridge 22; and a steering handlebar 24 secured to the top bridge 21.

The front wheel 2 is journaled at lower end portions of the front forks 23, 23. A front fender 25 covering above the front wheel 2 is supported by the bottom bridge 22.

The left and right center frames 17, 17 are coupled to each other in the vehicle width direction by a pivot shaft 26.

The swing arm 12 has a front end portion pivotally supported by the pivot shaft 26. A rear suspension 27 is suspended to extend between the swing arm 12 and the body frame F. The rear wheel 3 is journaled at a rear end portion of the swing arm 12.

The motorcycle 1 has a large available travel of a suspension made up of the front fork 23 and the rear suspension 27, and therefore the motorcycle 1 is an ATV (All Terrain Vehicle) suitable for rough terrain.

The engine 10 is placed under the main frames 15, 15 and between the down frame 16 and the center frames 17, 17.

The engine 10 includes: a crankcase 30 accommodating a crankshaft (not shown); and a cylinder portion 31 extending upward from the upper surface of a front portion of the crankcase 30.

The cylinder portion 31 includes a cylinder block 31a, a cylinder head 31b and a head cover 31c.

A transmission is accommodated in a rear portion of the crankcase 30. The drive power of the engine 10 is transferred to the rear wheel 3 through a drive chain 33 which is stretched between the rear wheel 3 and an output shaft 32 of the transmission.

An exhaust pipe 34 of the engine 10 is extracted and extends rearward from a front surface of the cylinder head 31b. A muffler 35 is connected to a rear end of the exhaust pipe 34.

An intake system 36 of the engine 10 is placed upward of a rear portion of the crankcase 30 and rearward of the cylinder portion 31. The intake system 36 includes: an air cleaner box 37 drawing and cleaning outside air; and a throttle body 38 adjusting the amount of air fed into the cylinder portion 31.

The throttle body 38 is located under the seat frames 18, 18 and between the cylinder portion 31 and the air cleaner box 37, as seen in the side view of the vehicle. The throttle body 38 is connected to a rear surface of the cylinder head 31b.

The seat 13 is mounted on the upper surfaces of the seat frames 18, 18, and is supported by the seat frames 18, 18.

A fuel tank 40 has a lower portion placed between the left and right main frames 15, 15. The fuel tank 40 has an upper portion located above the main frames 15, 15. A rear portion of the fuel tank 40 is located above the front end portions of the seat frames 18, 18.

The fuel tank 40 is placed between the seat 13 and the head pipe 14, as seen in the side view of the vehicle, and the fuel tank 40 is supported by the body frame F.

Figure 3:
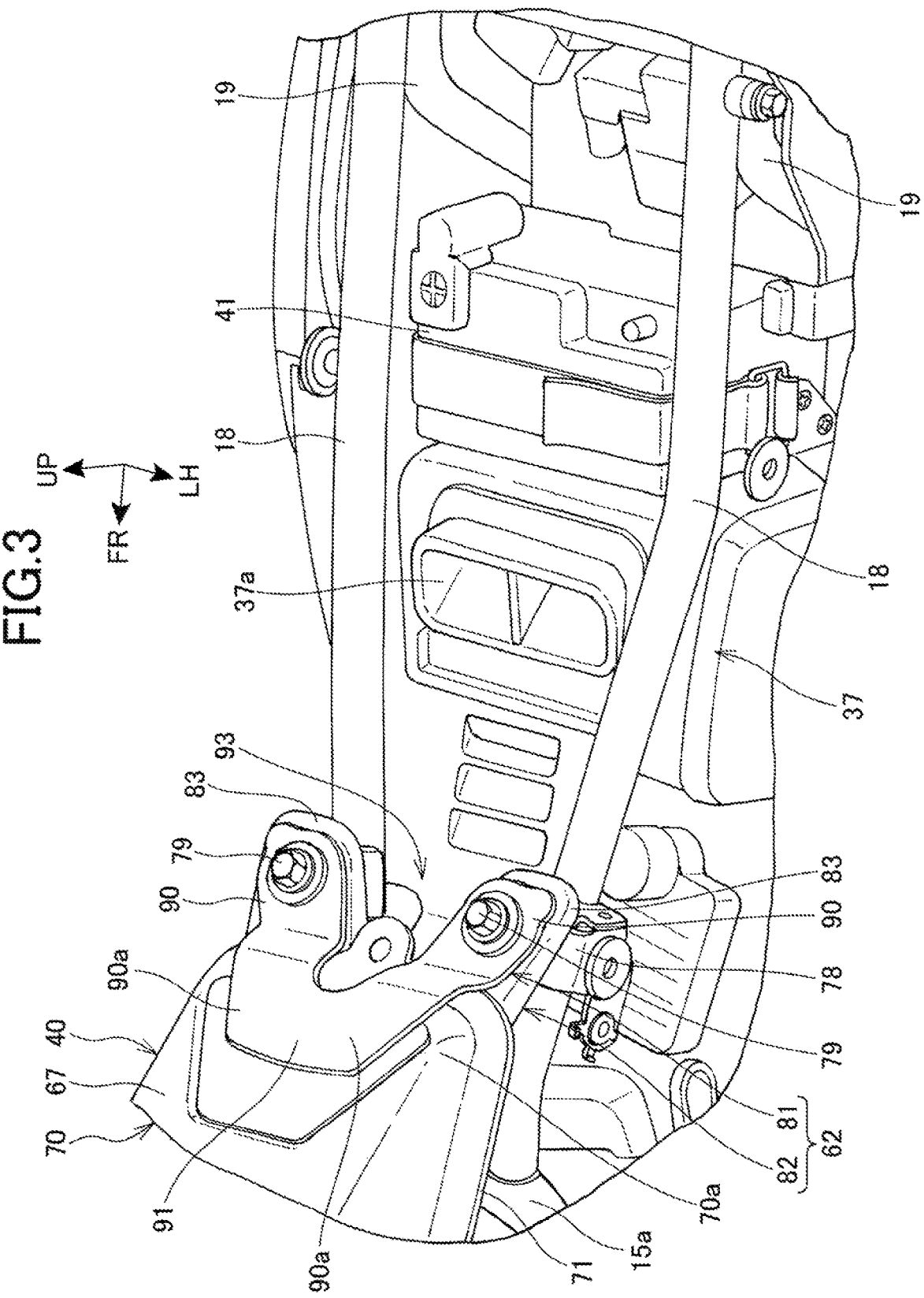
FIG. 3 is a perspective view illustrating components placed rearward of a fuel tank and under the seat.

FIG. 3 is a perspective view illustrating components placed rearward of the fuel tank 40 and under the seat 13. In FIG. 3, the seat 13 is dismounted.

As shown in FIG. 2 and FIG. 3, the air cleaner box 37 is placed under the seat frames 18, 18 and between the center frames 17, 17 and the subframes 19, 19. The air cleaner box 37 has an intake port 37a opening into an area above between the left and right seat frames 18, 18.

A box-shaped battery 41 (electrical equipment) is located between the air cleaner box 37 and the subframes 19, 19 in the front-rear direction, and also is placed between the left and right seat frames 18, 18. The battery 41 is located under the seat 13.

Referring to FIG. 1 and FIG. 2, the motorcycle 1 includes, as a body cover covering the vehicle body: a tank cover 45 that covers above the fuel tank 40; a pair of left and right side covers 46, 46 that laterally cover a front section of the vehicle body; a pair of left and right covers 47, 47 that are mounted to lower portions of the side covers 46, 46; a pair of left and right rear side covers 48, 48 that cover areas below a rear portion of the seat 13; and a front cover 49 that covers the front of the head pipe 14.

Particularly, each of the side covers 46, 46 integrally includes a side-cover front portion 50 and a side-cover rear portion 51. The side-cover front portion 50 laterally covers the front end portion of the body frame F and the fuel tank 40. The side-cover rear portion 51 is located below the seat 13 to cover the side of the seat frame 18.

The side-cover front portion 50 integrally includes a front-rear extending portion 50a and a downward extending portion 50b. As seen in the side view of the vehicle, the front-rear extending portion 50a extends forward from between the seat 13 and the main frame 15 to the head pipe 14, and the downward extending portion 50b extends downward from a front end portion of the front-rear extending portion 50a.

Each of the covers 47, 47 extends upwardly toward the rear from a rear edge of a lower portion of the downward extending portion 50b of the side-cover front portion 50, and then the cover 47 is coupled to a lower edge of a rear portion of the front-rear extending portion 50a, so as to link the downward extending portion 50b and the front-rear extending portion 50a with each other.

The side-cover front portion 50 and the cover 47 form a shroud 52 that laterally covers the front section of the vehicle body. The shrouds 52 are paired and provided respectively on the left and right sides of the fuel tank 40.

Particularly, the front-rear extending portion 50a of the shroud 52 laterally covers a lower portion of the head pipe 14, the upper end portion of the down frame 16, the gusset 20, the front end portion of the main frame 15 and the fuel tank 40. The downward extending portion 50b of the shroud 52 laterally covers the upper portion of the down frame 16 and the lower portion of the gusset 20.

The cover 47 of the shroud 52 laterally covers a space between the main frame 15 and the cylinder portion 31, the main frame 15 and a lower portion of the rear portion of the fuel tank 40, as seen in the side view of the vehicle.

The shroud 52 includes a side opening 52a extending through the shroud 52 in the vehicle width direction. The side opening 52a is defined by the lower edge of the front-rear extending portion 50a, the rear edge of the upper portion of the downward extending portion 50b and the upper edge of the cover 47. The side opening 52a is located rearward of the down frame 16, and the side opening 52a laterally overlaps the main frame 15 and the lower portion of the front portion of the fuel tank 40.

Figure 4:
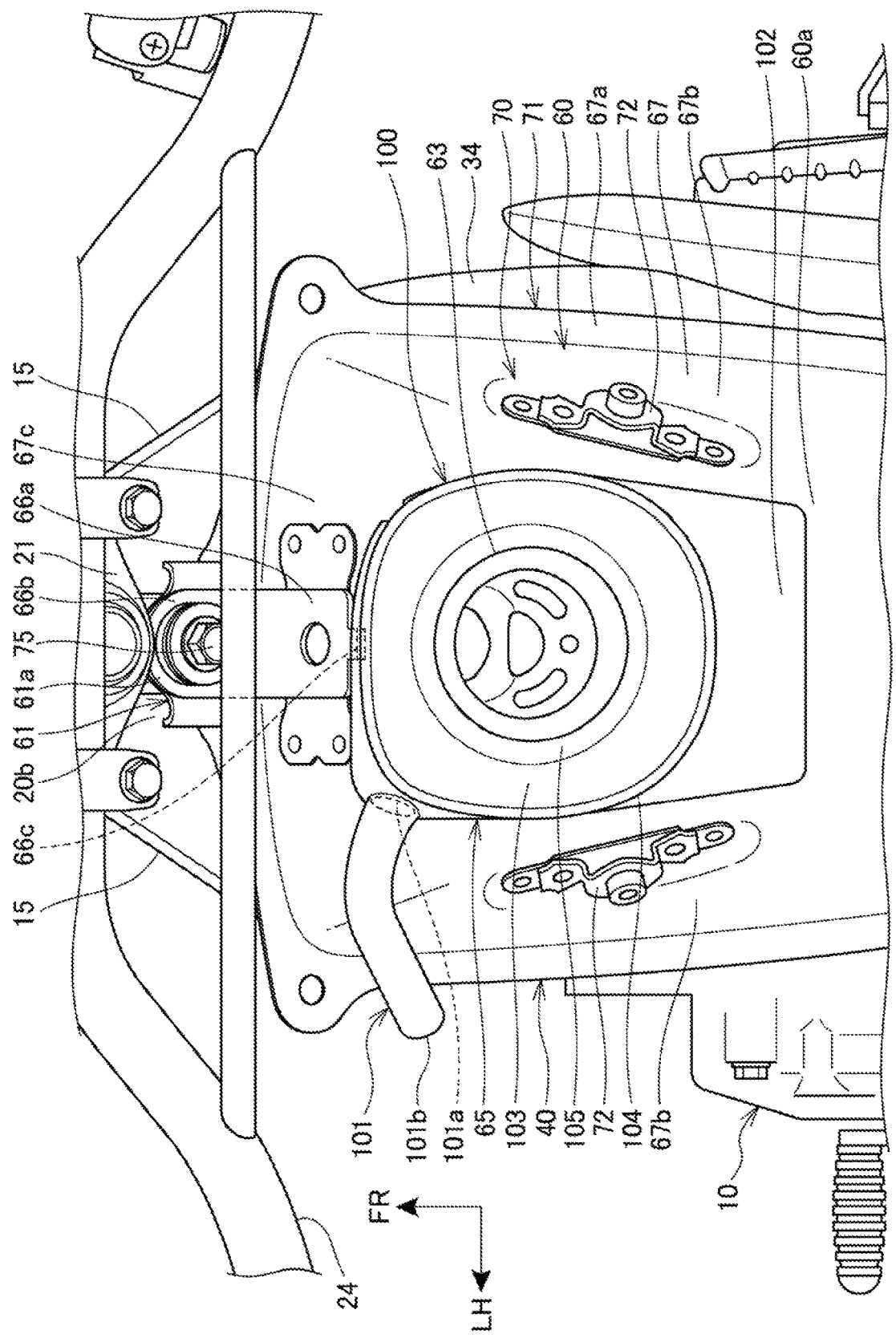
FIG. 4 is a plan view of the installed condition of a front portion of the fuel tank when viewed from above.
Figure 5:
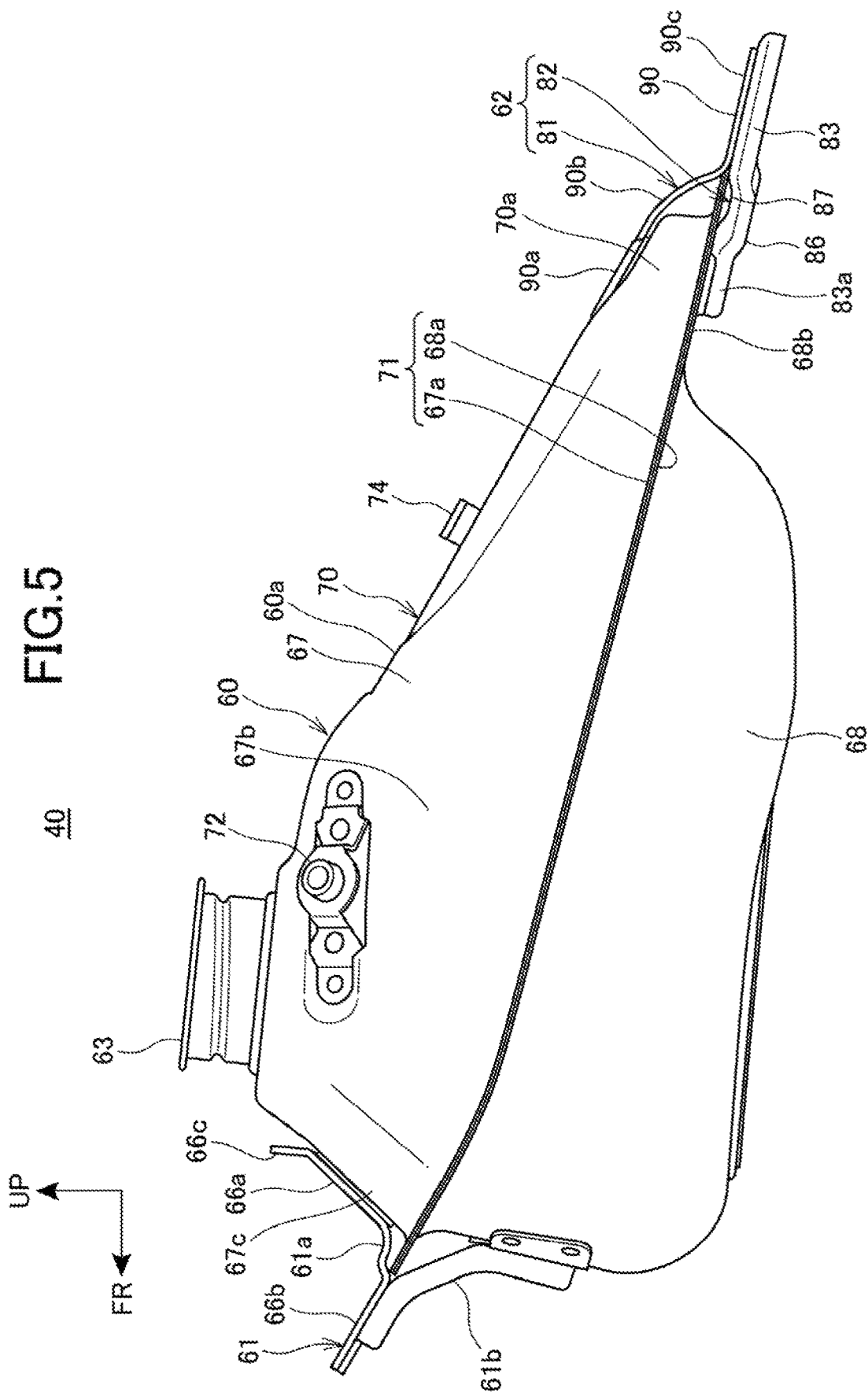
FIG. 5 is a left side view of the fuel tank.

FIG. 4 is a plan view of the installed condition of the front portion of the fuel tank 40 when viewed from above. In FIG. 4, a portion of the body cover, the seat 13 and the like are dismounted. FIG. 5 is a left side view of the fuel tank 40.

The fuel tank 40 includes: a tank-shaped tank body 60; a front stay 61 extending forward from a front end portion of the tank body 60; and a rear stay 62 (stay) extending rearward from a rear end portion of the tank body 60.

The fuel tank 40 is supported on the body frame F through the front stay 61 and the rear stay 62.

A filler opening 63 is provided as a fuel inlet in a front portion of an upper surface 60a of the tank body 60. The filler opening 63 is provided in a central portion in the vehicle width direction in the tank body 60. The filler opening 63 has a cylindrical shape extending upward from the upper surface 60a. The filler opening 63 is closed by a tank cap 64 attached to the filler opening 63.

A fuel sump 65 is installed around the filler opening 63 in the upper surface 60a of the tank body 60, and the fuel sump 65 collects fuel overflowing from the filler opening 63.

Figure 6:
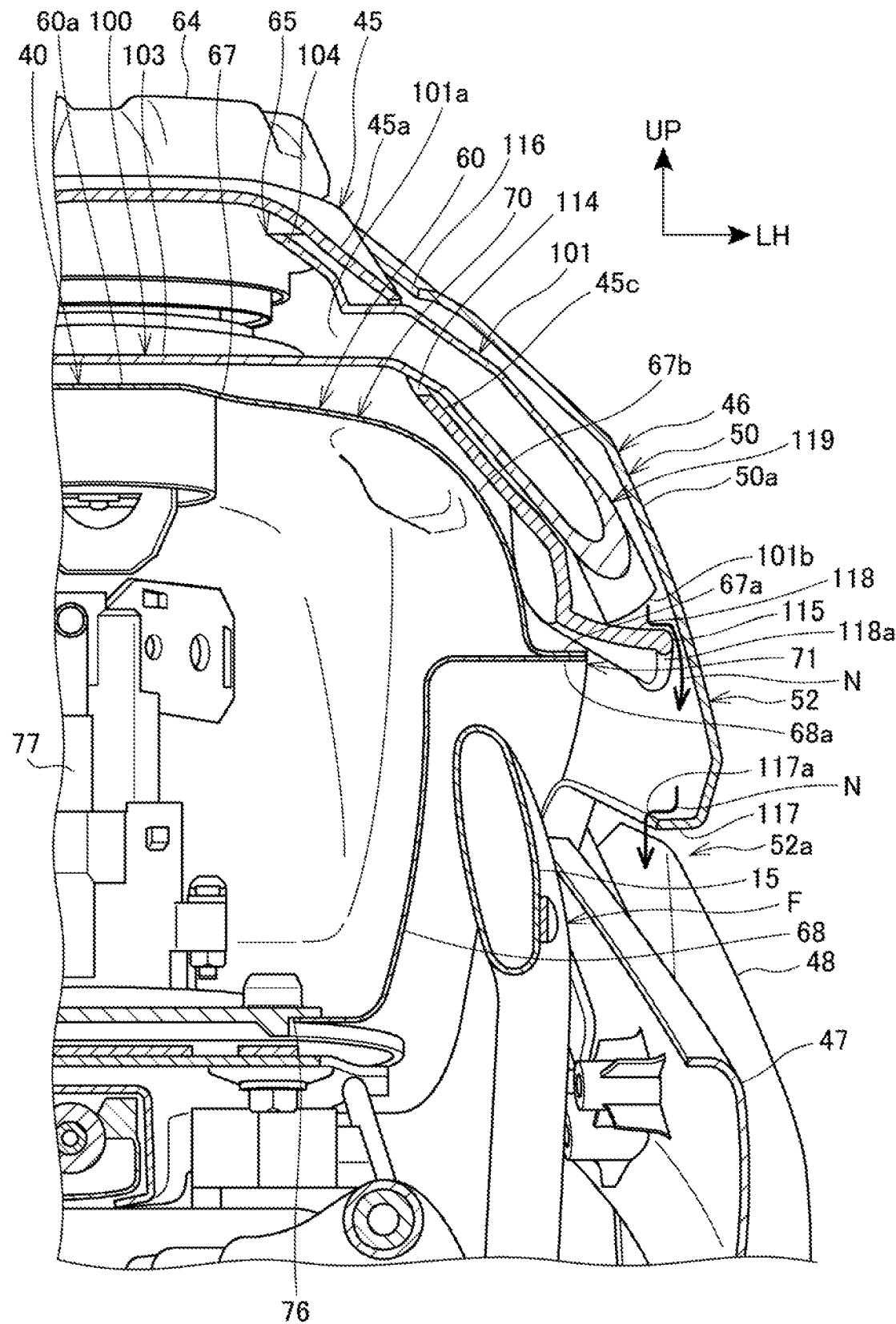
FIG. 6 is a sectional view taken along VI-VI line of FIG. 1.

FIG. 6 is a sectional view taken along VI-VI line of FIG. 1.

Referring to FIG. 2 to FIG. 6, the tank body 60 is divided into two halves, an upper half 67 forming an upper portion of the tank body 60 and a lower half 68 forming a lower portion of the tank body 60. The tank body 60 is formed in a tank shape by joining the upper half 67 and the lower half 68 together.

The upper half 67 is formed in a case shape having a lower surface with a downward opening. An upper flange 67a is formed all around the perimeter edge of the opening of the lower surface of the upper half 67, and the upper flange 67a extends outward of the tank body 60.

The lower half 68 is formed in a case shape having an upper surface with an upward opening. A lower flange 68a is formed all around the perimeter edge of the opening in the upper surface of the lower half 68, and the lower flange 68a extends outward of the tank body 60.

The tank body 60 is formed into a tank shape by making the upper flange 67a and the lower flange 68a abut on each other and then by joining the upper and lower flanges 67a, 68a together.

The tank body 60 includes: a tank-shaped fuel reservoir 70 that is capable of storing fuel therein; and a plate-shaped flange 71 that is made up of the upper flange 67a and the lower flange 68a. The flange 71 protrudes outward from left and right side surfaces, a front surface and a rear surface of the fuel reservoir 70.

The fuel tank 40 is placed such that a portion of the lower half 68 is located between the left and right main frames 15, 15 and the flange 71 is located above the main frames 15, 15. As seen in the side view of the vehicle, the flange 71 extends rearward in such a manner as to be more gently inclined downwardly toward the rear than the main frames 15, 15.

The filler opening 63 is provided in the upper surface of the upper half 67, and the fuel sump 65 is mounted on the upper half 67.

Side-cover mounts 72, 72 are installed on left and right side surfaces 67b, 67b of a front portion of the upper half 67. Upper portions of the respective side covers 46, 46 are fastened respectively to the side-cover mounts 72, 72 with side-cover fixation bolts 46a, 46a (FIG. 1) that are inserted through the side covers 46, 46 from the outside in the vehicle width direction.

A rear portion of the upper surface of the upper half 67 (the upper surface 60a of the tank body 60) is formed to be inclined downwardly toward the rear, as seen in the side view of the vehicle. In this portion, a seat lock portion 74 (FIG. 1) is placed to lock the lower surface of a front end portion of the seat 13. The front end portion of the seat 13 is secured to the fuel tank 40 by engaging the seat 13 with the seat lock portion 74.

Referring to FIG. 2, FIG. 4 and FIG. 5, the front stay 61 of the fuel tank 40 includes: an upper plate 61a that extends forward from the front surface 67c of the upper half 67; and a lower plate 61b extending upward toward the front from the front surface of the lower half 68.

The upper plate 61a of the front stay 61 includes: a joint 66a that is joined to the front surface 67c; a fixation portion 66b that extends upward toward the front from a lower end of the joint 66a along the top gusset 20b; and a fuel sump lock portion 66c that protrudes above the upper half 67 from an upper end of the joint 66a.

The lower plate 61b of the front stay 61 extends upward toward the front from the front surface of the lower half 68, and then is coupled to the lower surface of the fixation portion 66b of the upper plate 61a.

The top gusset 20b of the body frame F includes a front tank fixation portion 73 (stay) to which the front stay 61 is secured.

The front stay 61 is secured to the front tank fixation portion 73 by use of a tank fixture 75 that is inserted from above through the fixation portion 66b of the front stay 61. The tank fixture 75 is, for example, a bolt.

As illustrated in FIG. 6, a pump mounting opening 76 is provided in the lower surface of the front portion of the lower half 68. A fuel pump 77, which delivers fuel toward the engine 10, is inserted from the pump mounting opening 76 into the fuel reservoir 70 and is attached to the pump mounting opening 76.

Figure 7:
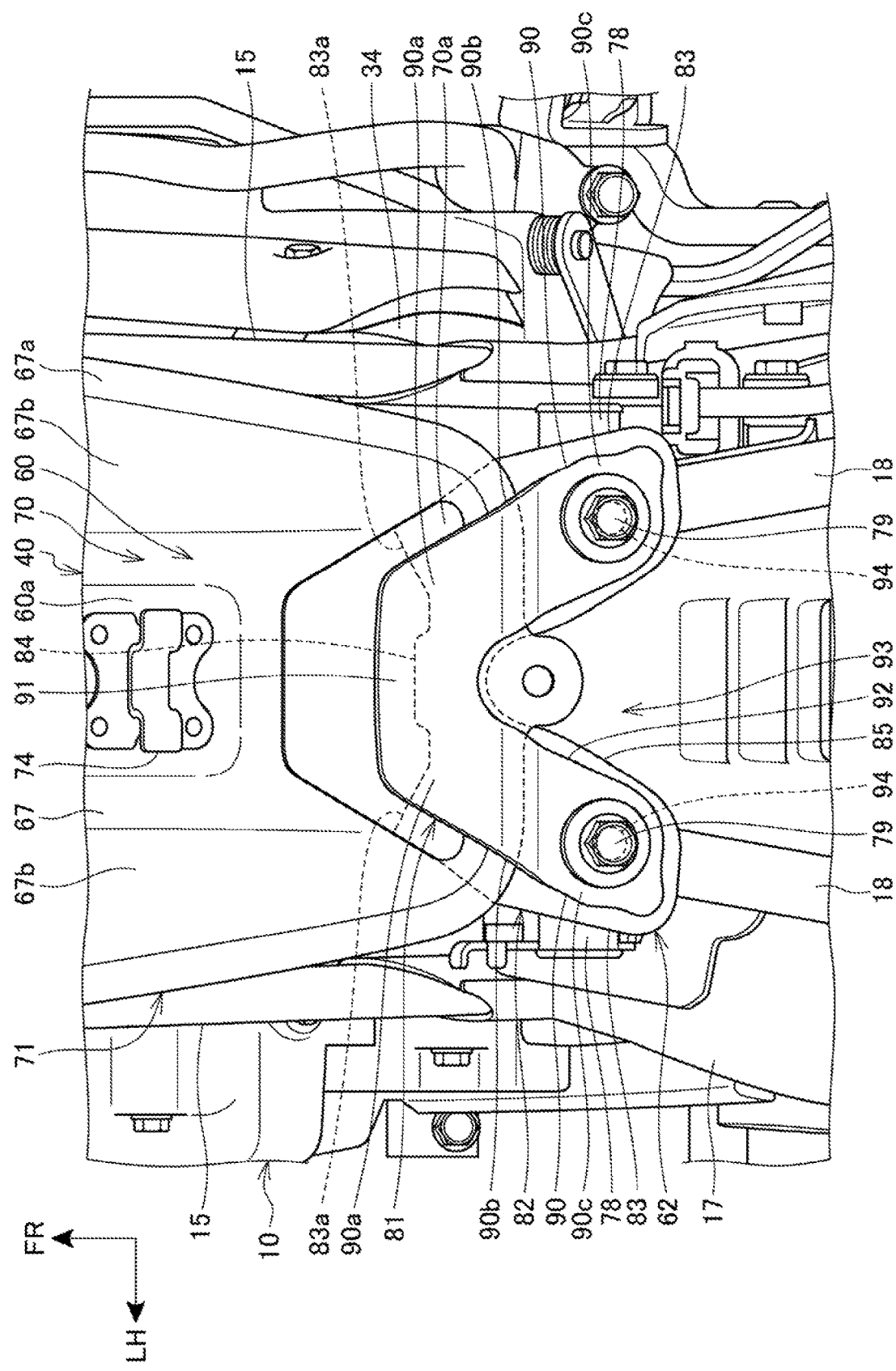
FIG. 7 is a plan view of the installed condition of a rear portion of the fuel tank when viewed from above.
Figure 8:
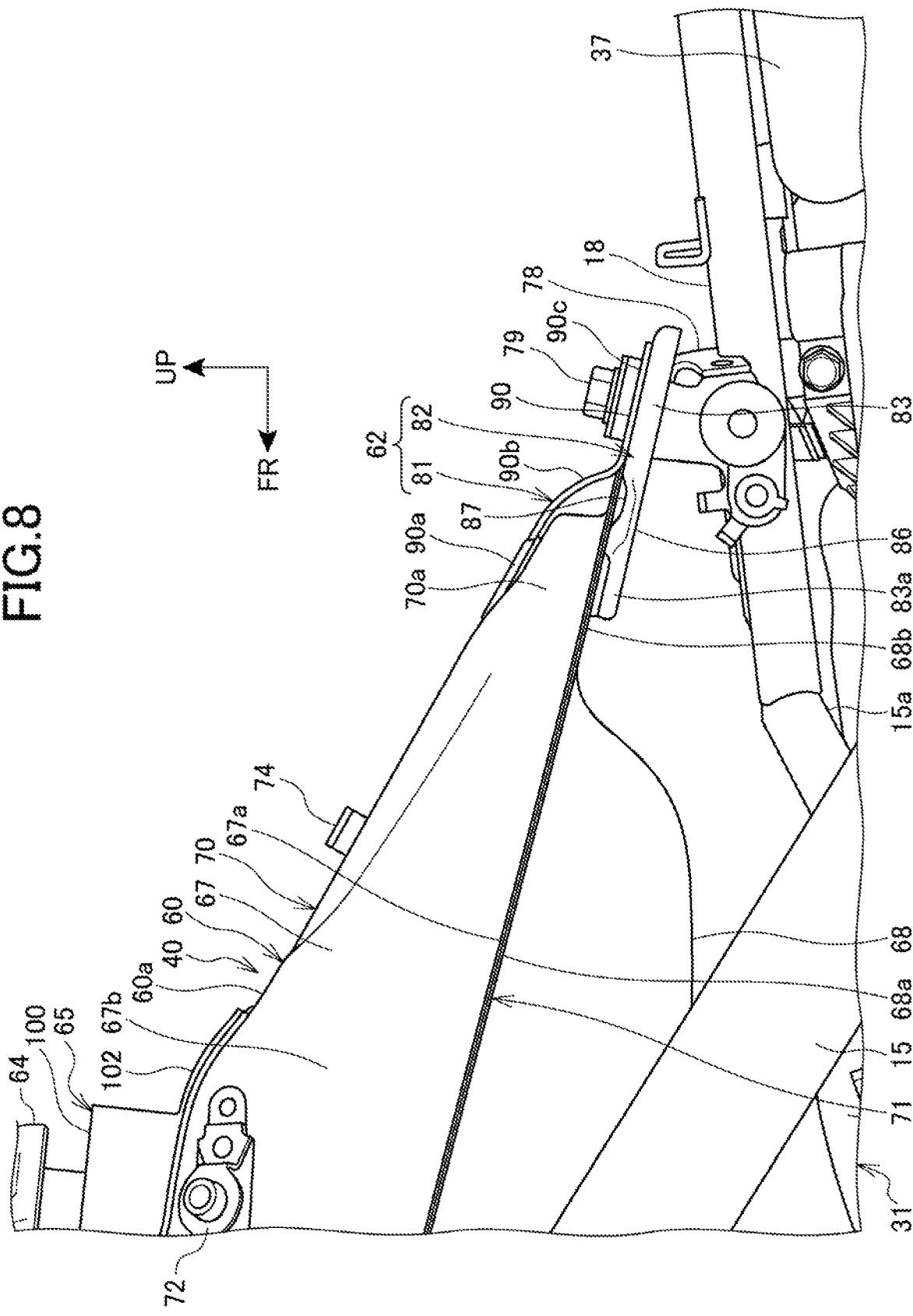
FIG. 8 is a left side view illustrating the installed condition of the rear portion of the fuel tank.

FIG. 7 is a plan view of the installed condition of the rear portion of the fuel tank 40 when viewed from above. FIG. 8 is a left side view illustrating the installed condition of the rear portion of the fuel tank 40. In FIG. 7 and FIG. 8, the body cover is dismounted.

Rear tank fixation portions 78, 78 are provided respectively on the upper surfaces of the respective front portions of the left and right seat frames 18, 18, and the rear stay 62 of the fuel tank 40 is secured to the rear tank fixation portions 78, 78. The rear tank fixation portions 78, 78 are arranged upright from the upper surfaces of the seat frames 18, 18 in the upward direction.

Tank fixtures 79, 79, which secure the rear stay 62 to the rear tank fixation portions 78, 78, are fastened to the upper surfaces of the rear tank fixation portions 78, 78. The tank fixtures 79, 79 are, for example, bolts.

The rear end portion of the lower half 68 is provided with a planar portion 68b that is flush with the lower flange 68a around the rear end portion. The planar portion 68b is a flat surface that links, in the vehicle width direction, between the left and right lower flanges 68a in the rear end portion of the lower half 68. The planar portion 68b is a portion which is flush with the lower flange 68a but is not joined to the upper flange 67a.

A rear-end fuel reservoir 70a (the rear end portion of the fuel reservoir) is provided in the rear end portion of the fuel reservoir 70, and the rear-end fuel reservoir 70a is formed between the planar portion 68b of the lower half 68 and the rear end portion of the upper half 67. In the rear-end fuel reservoir 70a, fuel is stored in the space between the upper surface of the upper half 67 and the planar portion 68b of the lower half 68.

The rear stay 62 includes an upper stay 81 and a lower stay 82. The upper stay 81 extends rearward from the upper surface of the rear end portion of the fuel reservoir 70, and the lower stay 82 extends rearward from the lower surface of the rear end portion of the fuel reservoir 70.

The upper stay 81 and the lower stay 82 are coupled to each other in a position rearward of the fuel reservoir 70.

The lower stay 82 is formed in a plate shape extending straight downward toward the rear along the lower flange 68a, as seen in the side view of the vehicle.

The lower stay 82 is formed in a V shape integrally including a pair of left and right lower arms 83, 83 and a coupling portion 84. The left and right lower arms 83, 83 extend rearward from the lower surface of the fuel reservoir 70, and the coupling portion 84 couples left and right base end portions 83a, 83a of the respective lower arms 83, 83 to each other.

The coupling portion 84 corresponds to the bottom of the V shape, and a lower cutout 85 corresponding to the valley of the V shape is formed between the left and right lower arms 83, 83.

The lower stay 82 includes a perimeter-edge rib 86 that extends approximately all around the lower stay 82 and that extends downward from the perimeter edge. The perimeter-edge rib 86 increases the rigidity of the lower stay 82.

Particularly, the coupling portion 84 and the base end portions 83a, 83a of the lower arms 83, 83 are joined to the lower surface of the planar portion 68b of the lower half 68 by welding, thereby combining the lower stay 82 with the lower half 68. Specifically, the base end portion of the lower stay 82 is combined with the lower surface of the rear-end fuel reservoir 70a. Because the lower stay 82 has a V shape, it is possible to ensure a large site welded to the planar portion 68b. Because of this, the lower stay 82 can be firmly fixed to the planar portion 68b. It is noted that welding of the lower stay 82 to the planar portion 68b can be provided by welding using a weld bead along the outer perimeter of the base end portion of the lower stay 82 or by spot welding of the base end portion of the lower stay 82.

The coupling portion 84 of the lower stay 82 is arranged in the central portion in the vehicle width direction in the tank body 60.

The lower arms 83, 83 extend obliquely rearward and outward in the vehicle width direction from the lower surface of the planar portion 68b as seen in a plan view. The rear end portions of the lower arms 83, 83 overlap, from above, the rear tank fixation portions 78, 78 of the respective seat frames 18, 18. On the top surfaces of the lower arms 83, 83, in a portion overlapping the lower flange 68a, a recessed portion 87, which is concave downward to avoid the lower flange 68a, is formed.

The lower cutout 85 is a triangle-shaped cutout tapered from the rear end portions of the lower arms 83, 83 toward the coupling portion 84, and the lower cutout 85 extends in the front-rear direction.

The upper stay 81 is formed in a plate shape approximately facing the lower stay 82 from above.

The upper stay 81 is formed in a V shape integrally including a pair of left and right upper arms 90, 90 and a coupling portion 91. The left and right upper arms 90, 90 extend rearward from the upper surface of the fuel reservoir 70, and the coupling portion 91 couples left and right base end portions 90a, 90a of the respective upper arms 90, 90 to each other.

The coupling portion 91 corresponds to the bottom of the V shape, and an upper cutout 92 corresponding to the valley of the V shape is formed between the left and right upper arms 90, 90.

Particularly, the coupling portion 91 and the base end portions 90a, 90a of the upper arms 90, 90 are joined to the upper surface of the rear portion of the upper half 67 in the fuel reservoir 70 by welding, thereby combining the upper stay 81 with the upper half 67. Specifically, the base end portion of the upper stay 81 is combined with the upper surface of the rear-end fuel reservoir 70a.

Because the upper stay 81 has a V shape, it is possible to ensure a large site welded to the upper surface of the rear-end fuel reservoir 70a. Because of this, the upper stay 81 can be firmly fixed to the rear-end fuel reservoir 70a. It is noted that welding of the upper stay 81 to the rear-end fuel reservoir 70a can be provided by welding using a weld bead along the outer perimeter of the base end portion of the upper stay 81 or by spot welding of the base end portion of the upper stay 81.

The coupling portion 91 is placed in the central portion in the vehicle width direction in the tank body 60.

The upper arms 90, 90 extend obliquely rearward and outward in the vehicle width direction from the upper surface of the rear-end fuel reservoir 70a as seen in a plan view.

The upper arms 90, 90 respectively include: base end portions 90a, 90a; bent portions 90b, 90b; and coupling portions 90c, 90c. The bent portions 90b, 90b are bent downward from rear ends of the base end portions 90a, 90a and then extend to the upper surfaces of the lower arms 83, 83. The coupling portions 90c, 90c extend rearward from lower ends of the bent portions 90b, 90b along the upper surfaces of the lower arm 83, 83.

At the rear of the rear-end fuel reservoir 70a, the coupling portions 90c, 90c overlap the rear end portions of the lower arms 83, 83 from above, and the coupling portions 90c, 90c are combined with the upper surfaces of the rear end portions of the lower arms 83, 83 by welding.

Specifically, the upper stay 81 and the lower stay 82 are coupled via the coupling portions 90c, 90c to each other in the vertical direction at the rear of the rear-end fuel reservoir 70a.

The upper cutout 92 is a triangle-shaped cutout tapered from the rear end portions of the upper arms 90, 90 toward the coupling portion 91, and the upper cutout 92 extends in the front-rear direction.

The upper stay 81 is formed in a V shape following the lower stay 82, and almost the whole of the upper stay 81 overlaps the lower stay 82 from above as seen in a plane view.

Specifically, the rear stay 62 is formed in a V shape by overlapping of the upper stay 81 and the lower stay 82 in the vertical direction as seen in a plane view. The rear stay 62 includes a cutout 93 formed by overlapping of the upper cutout 92 and the lower cutout 85 in the vertical direction.

The rear stay 62 also includes fastening portions 94, 94 in the rear end portion where the coupling portions 90c, 90c of the upper stay 81 and the lower arms 83, 83 overlap each other, and the fastening portions 94, 94 are fastened to the rear tank fixation portions 78, 78 of the seat frames 18, 18. The fastening portions 94, 94 are holes extending through the rear stay 62 in the vertical direction.

The rear stay 62 is fastened to the rear tank fixation portions 78, 78 by the tank fixtures 79, 79 which are inserted through the fastening portions 94, 94 from above.

Specifically, the left and right fastening portions 94, 94 of the rear stay 62 are secured respectively to the left and right seat frames 18, 18 through the rear tank fixation portions 78, 78.

The cutout 93 of the rear stay 62 extends forward from the rear end of the rear stay 62 beyond the fastening portions 94, 94, and a front end of the cutout 93 overlaps the rear-end fuel reservoir 70a from above.

The cutout 93 is located rearward of the rear-end fuel reservoir 70a and between the front end portions of the left and right seat frames 18, 18, and also is located at the center of the vehicle width. The cutout 93 is located forward of the air cleaner box 37.

In the embodiment, the rear stay 62 is placed such that the rear-end fuel reservoir 70a is placed vertically between the base end portion of the upper stay 81 and the base end portion of the lower stay 82, and the base end portion of the upper stay 81 and the base end portion of the lower stay 82 are joined to the rear-end fuel reservoir 70a. Therefore, the rear stay 62 can be formed in a three-dimensional shape in the vertical direction, so that the rigidity of the rear stay 62 can be enhanced.

The motorcycle 1 is an ATV having a vehicle body acted upon in the vertical direction by a large external force resulting from road conditions, but the motorcycle 1 is capable of satisfactorily traveling on rough terrain because the fuel tank 40 is able to be firmly secured in the vertical direction by the rear stay 62.

Further, the rigidity of the rear stay 62 can be enhanced because the upper stay 81 and the lower stay 82 are coupled to each other at the rear of the rear-end fuel reservoir 70*a*.

Moreover, an increase in capacity of the fuel tank 40 is possible because fuel can be stored in the rear-end fuel reservoir 70*a* between the base end portion of the upper stay 81 and the base end portion of the lower stay 82.

A portion of the travelling air of the motorcycle 1 passes through the inside of the body cover such as the shrouds 52, 52 and the like. The portion of the travelling air, which flows along the fuel tank 40 on the inside of the body cover, flows through the cutout 93 of the rear stay 62 into the intake port 37*a* of the air cleaner box 37 and the battery 41, the intake port 37*a* and the battery 41 being located more rearward. Therefore, the high-efficiency drawing of air into the air cleaner box 37 can be performed and also the battery 41 can be cooled with efficiency by the travelling air.

The structure of the fuel sump 65 and the periphery of the fuel sump 65 will now be described.

Referring to FIG. 2 and FIG. 4, the fuel sump 65 integrally includes: a tray 100 that is placed around the filler opening 63; a drain pipe 101 through which the fuel collected in the tray 100 is drained to the outside; and a rear extension 102 (the rear end portion of the fuel sump) that extends rearward from the rear end portion of the tray 100.

The tray 100 includes: a bottom plate 103 placed around the filler opening 63 on the upper surface 60*a* of the tank body 60; a peripheral wall 104 that is arranged upright from a peripheral edge of the bottom plate 103 in the upward direction; and a cylindrical portion 105 that fits in an outer peripheral portion of the cylinder-shaped filler opening 63.

The cylindrical portion 105 is arranged upright from a central portion of the bottom plate 103 in the upward direction to cover the outer peripheral portion of the filler opening 63. The fuel sump 65 is positioned at the upper surface 60*a* of the tank body 60 by fitting the cylindrical portion 105 in the filler opening 63.

The fuel overflowing from the filler opening 63 is temporarily stored in a portion between the peripheral wall 104 and the cylindrical portion 105 on the bottom plate 103.

The drain pipe 101 extends downward from the tray 100.

An upper-end opening 101*a* of the drain pipe 101 is provided in one end portion (left end portion) in the vehicle width direction in a front end portion of the tray 100. The fuel collected in the tray 100 flows into the upper-end opening 101*a*.

The drain pipe 101 extends downward along a side surface 60*b* in the left-right direction on the tank body 60. An outlet 101*b* of the drain pipe 101 is provided at a lower end of the drain pipe 101.

The rear extension 102 of the fuel sump 65 is a plate-shaped portion extending rearward along the upper surface 60*a* of the tank body 60. The rear extension 102 extends rearward to near the front end of the seat 13.

An engaging portion with which the fuel sump lock portion 66*c* of the front stay 61 is engaging is placed on the lower surface of a front end portion of the tray 100. The fuel sump 65 is inhibited from rotationally moving around the filler opening 63 by the fuel sump lock portion 66*c* being engaged with the engaging portion.

Figure 9:
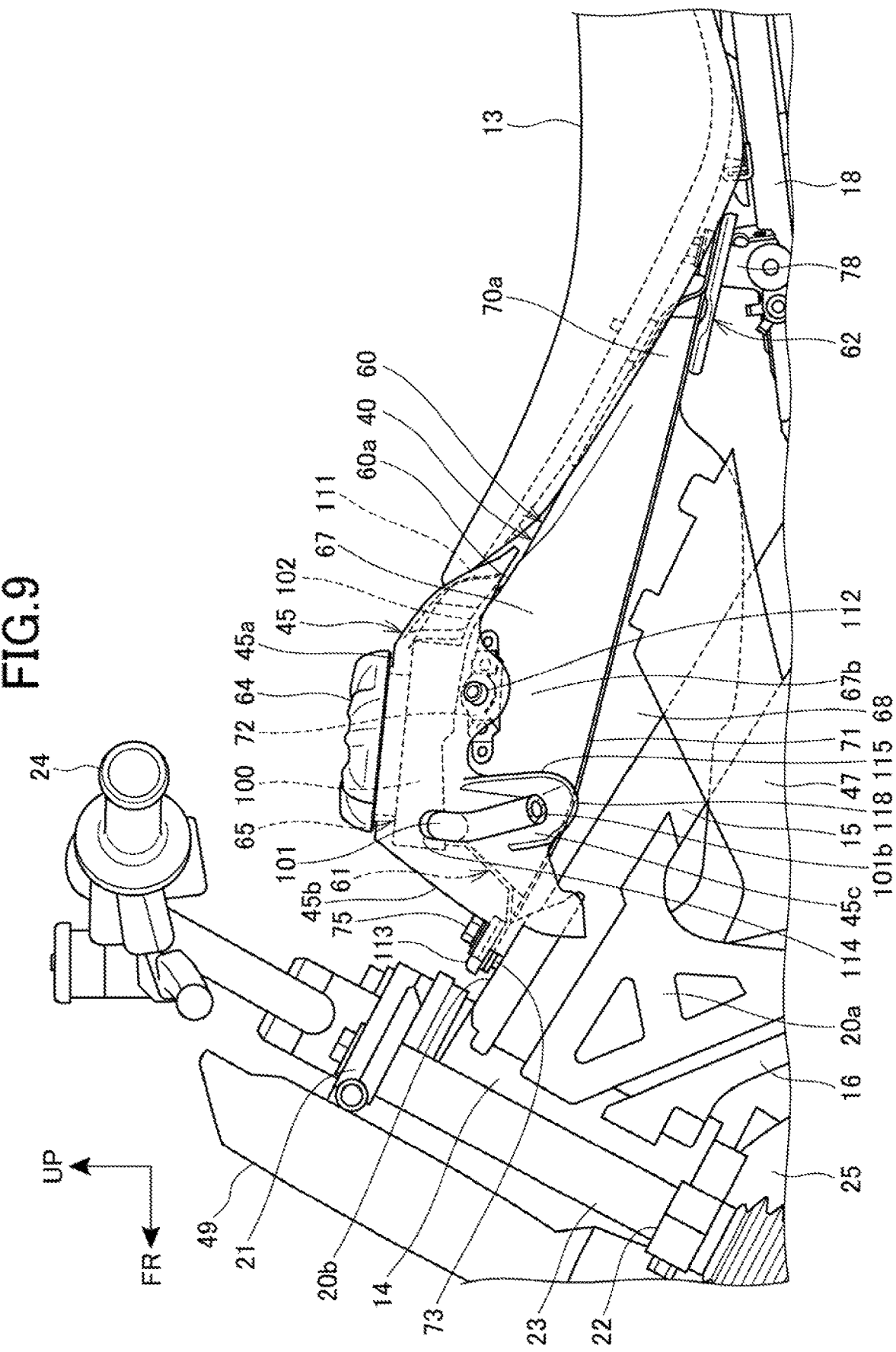
FIG. 9 is a left side view illustrating the state of attachment of a tank cover to the fuel tank.
Figure 10:
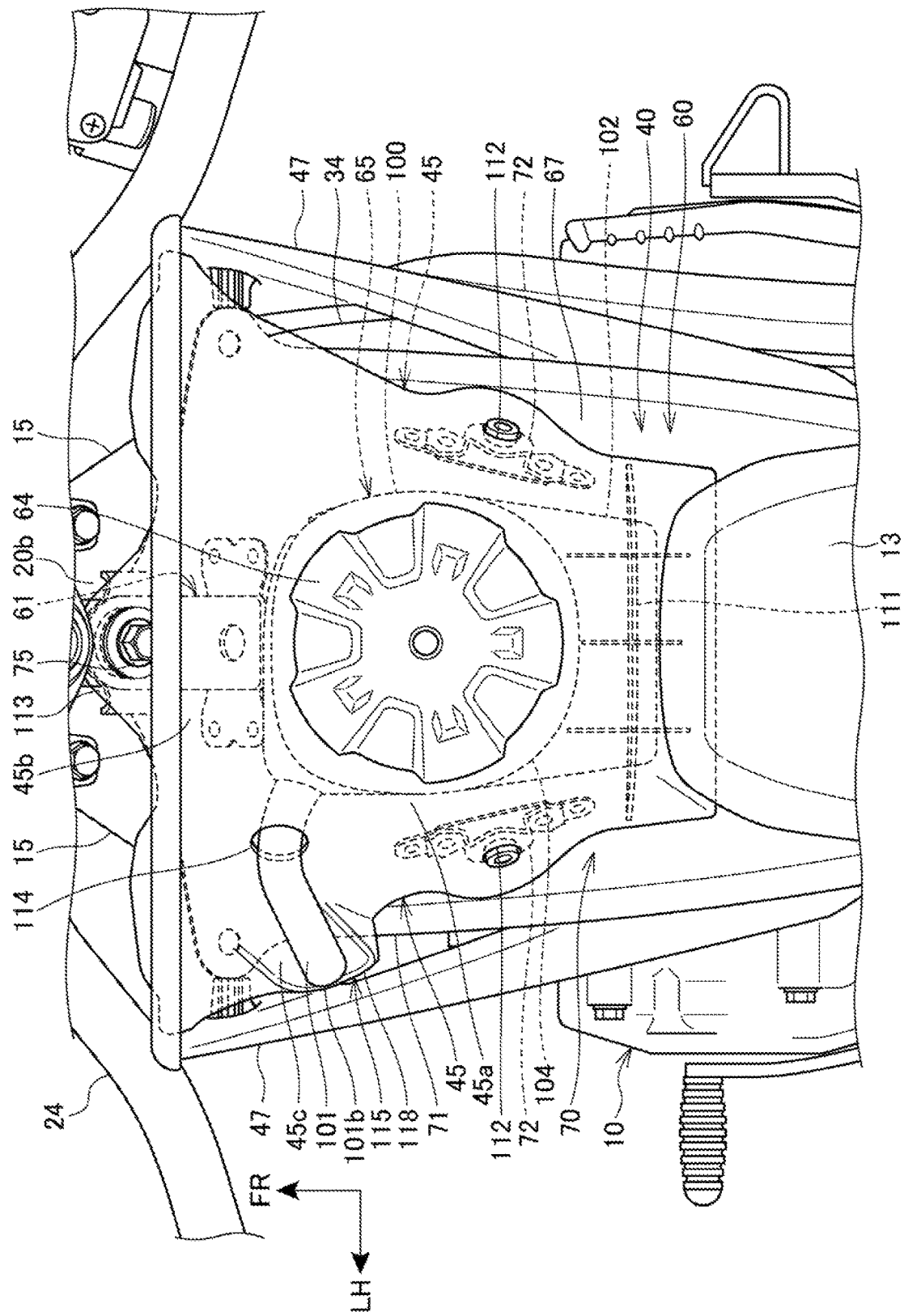
FIG. 10 is a plan view of the state of attachment of the tank cover to the fuel tank when viewed from above.
Figure 11:
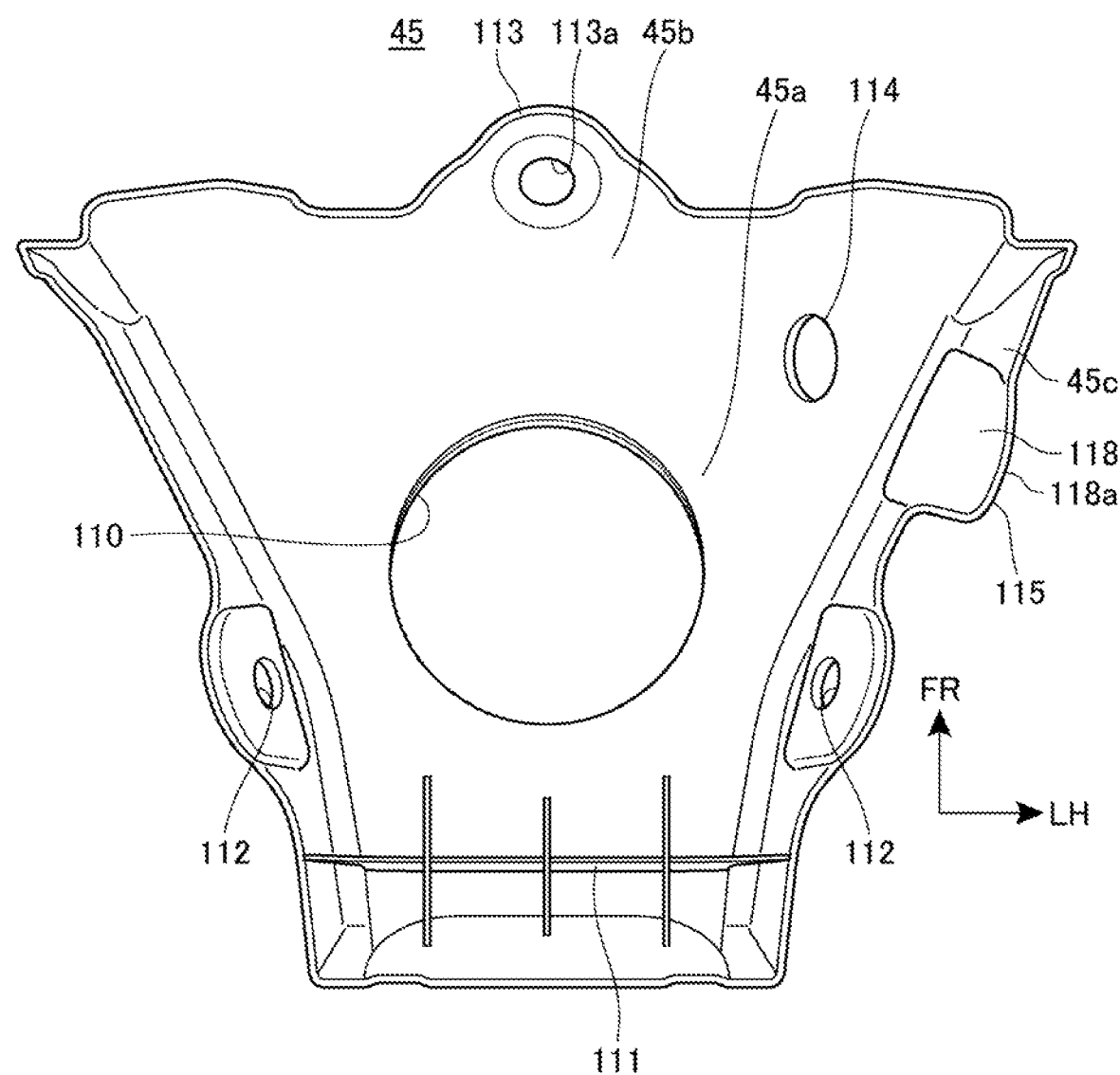
FIG. 11 is a plan view of the tank cover when viewed from below.

FIG. 9 is a left side view illustrating the state of attachment of the tank cover 45 to the fuel tank 40. FIG. 10 is a plan view of the state of attachment of the tank cover 45 to the fuel tank 40 when viewed from above. FIG. 11 is a plan view of the tank cover 45 when viewed from below. FIG. 9 and FIG. 10 do not show the side cover 46.

The tank cover 45 integrally includes: a tank-cover upper surface portion 45*a* that covers the upper surface 60*a* of the tank body 60 from above; a tank-cover front portion 45*b* that covers the front of the upper portion of the tank body 60 from front; and a tank-cover side portion 45*c* (overlap portion) that covers the upper portion of the front portion on the side surface 60*b* of the tank body 60.

The tank-cover upper surface portion 45*a* has a through hole 110 formed in a central portion, and the through hole 110 surrounds the outer periphery of the cylinder-shaped filler opening 63 as seen in a plan view. The filler opening 63 and the tank cap 64 are exposed above the tank cover 45 from the through hole 110.

Particularly, in the tank-cover upper surface portion 45*a*, a portion corresponding to the through hole 110 is located at a highest level, and the tank-cover upper surface portion 45*a* is inclined more downward as the tank-cover upper surface portion 45*a* extends forward, leftward, rightward and rearward from the through hole 110.

The tank-cover upper surface portion 45*a* covers above and around the tray 100 of the fuel sump 65.

A rear portion of the tank-cover upper surface portion 45*a* also covers above the rear extension 102 of the fuel sump 65. A plurality of reinforcing ribs 111 are arranged upright in a portion located rearward of the through hole 110 on the reverse side of the rear portion of the tank-cover upper surface portion 45*a*.

Holes 112, 112, through which the side-cover fixation bolts 46*a*, 46*a* (FIG. 1) are inserted from the outside, are formed in the left and right side surfaces of the rear portion of the tank-cover upper surface portion 45*a*.

The tank-cover front portion 45*b* extends downward from the front end of the tank-cover upper surface portion 45*a*. The tank cover 45 includes a mounting portion 113 extending upward from the lower end of the tank-cover front portion 45*b* toward the front. The mounting portion 113 has a hole 113*a* through which the tank fixture 75 is inserted.

Referring to FIG. 6 and FIGS. 9 to 11, the tank-cover side portion 45*c* is arranged in one end portion (left end portion) in the vehicle width direction in the front end portion of the tank cover 45, and the tank-cover side portion 45*c* is placed on one side, where the drain pipe 101 is mounted, of the left and right sides of the filler opening 63. The tank-cover side portion 45*c* extends downward and outward in the vehicle width direction from the outer end in the vehicle width direction in the front portion of the tank-cover upper surface portion 45*a*. A front edge of the tank-cover side portion 45*c* is continuous with the side portion of the tank-cover front portion 45*b*.

The tank-cover side portion 45*c* is provided with an opening 114 and a guide 115. The opening 114 passes through the tank-cover side portion 45*c* in the vehicle width direction. The guide 115 protrudes outward in the vehicle width direction from the outside surface of the tank-cover side portion 45*c* toward the shroud 52.

The opening 114 has a long hole shape elongated in the vertical direction. The opening 114 is provided in an upper portion of the tank-cover side portion 45*c*. The opening 114 is provided in a position overlapping the upper half 67 from the outside, and is located on the upper side of the flange 71 of the tank body 60.

The guide 115 is placed in a lower portion of the tank-cover side portion 45c, and is located below the opening 114. The guide 115 is formed in a wall shape surrounding the lower end portion of the drain pipe 101 from the under, front and rear sides, as seen in the side view of the vehicle.

Figure 12:
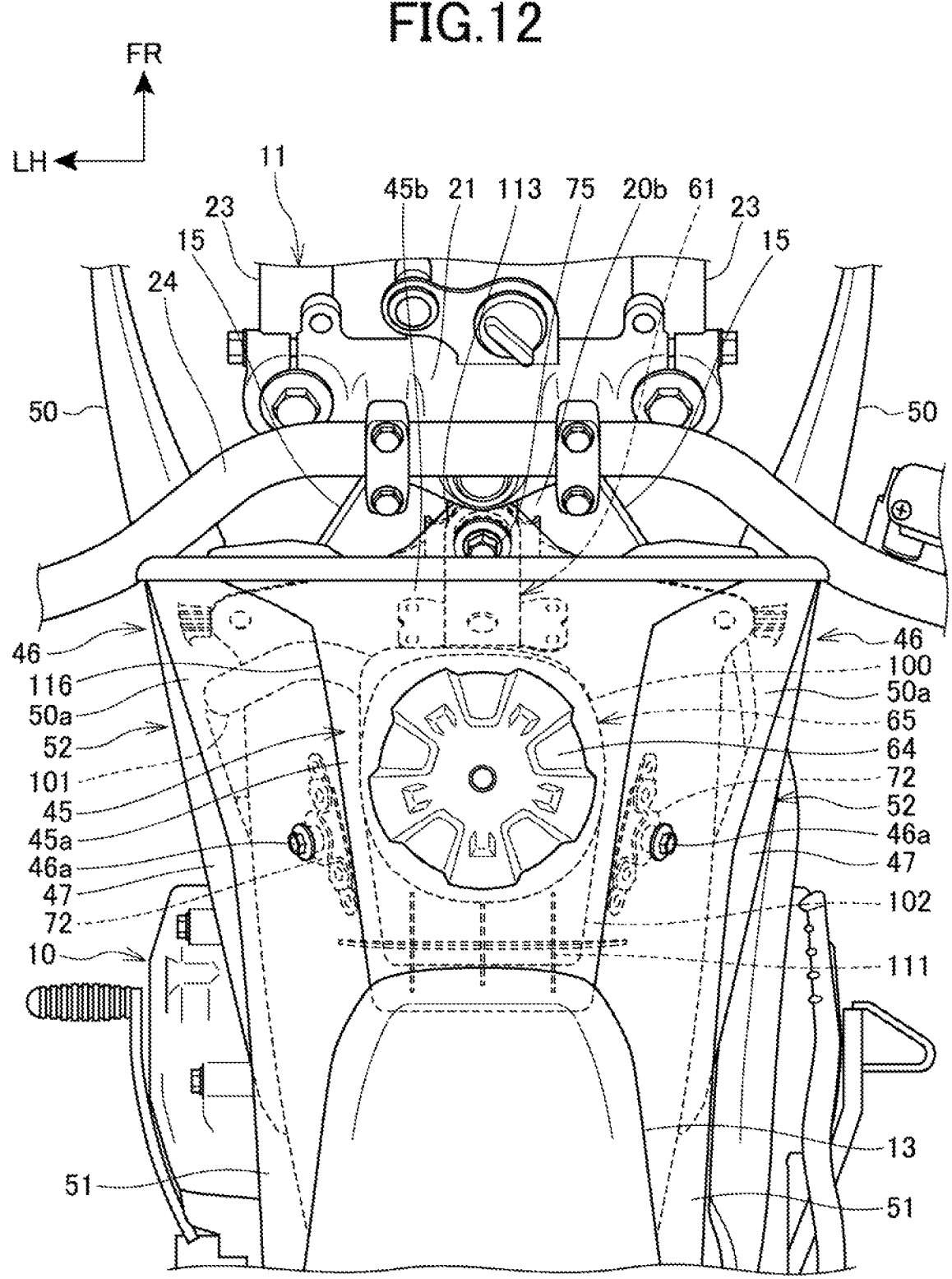
FIG. 12 is a plan view of the periphery of the fuel tank to which a shroud is attached, when viewed from above.

FIG. 12 is a plan view of the periphery of the fuel tank 40 to which the shroud 52 is attached, when viewed from above.

Referring to FIG. 1, FIG. 6 and FIG. 12, the left and right shrouds 52, 52 are inclined to be located more outward in the vehicle width direction as the left and right shrouds 52, 52 extend forward from the seat 13. A portion of the traveling air of the motorcycle 1 flows into the inside of the vehicle body along the inner sides of the shrouds 52, 52. Also, an occupant on the seat 13 presses the shrouds 52, 52 with his/her knees in order to hold the vehicle body.

A front-rear extending portion 50a of each shroud 52 laterally covers the tank body 60 and also laterally covers the tank-cover side portion 45c and the rear portion of the tank-cover upper surface portion 45a of the tank cover 45. A top edge 116 of the front-rear extending portion 50a laterally overlaps the tank cover 45 and the top edge 116 is also located above the opening 114.

The tank-cover side portion 45c is an overlap portion which is covered from outside the vehicle body with the front-rear extending portion 50a of the shroud 52 overlapping the overlap portion from the outside. The opening 114 is formed in the overlap portion. The opening 114 is covered with the shroud 52 from the outside.

As illustrated in FIG. 6, the front-rear extending portion 50a has a portion laterally covering the front portion of the tank body 60, and this portion of the front-rear extending portion 50a is inclined to be located more downward as the portion extends outward in the width direction from the top edge 116.

A rib 117 is provided at the lower edge of the front-rear extending portion 50a and the rib 117 is bent to extend toward the inside of the vehicle body (to extend inward in the vehicle width direction).

An outer end 118a of a lower wall 118 of the guide 115 of the tank cover 45 is located more outward in the vehicle width direction than an inner edge 117a of the rib 117 and an outer edge of the flange 71.

On the side of the tank body 60, a drain-pipe housing space 119 is created by being surrounded with the tank-cover side portion 45c, the front-rear extending portion 50a of the shroud 52 and the guide 115. The drain-pipe housing space 119 is located on the upper side of the flange 71 of the tank body 60.

It is noted that the drain-pipe housing space 119 needs only to be surrounded with at least the tank-cover side portion 45c and the front-rear extending portion 50a of the shroud 52, and the drain-pipe housing space 119 may be configured without the guide 115.

As illustrated in FIG. 6, the drain pipe 101 extends approximately horizontally outward in the vehicle width direction from the peripheral wall 104 of the fuel sump 65, and then passes through the opening 114 of the tank-cover side portion 45c from the inside of the tank cover 45 to be extracted to the outside of the tank cover 45.

The drain pipe 101 passes through the opening 114 to enter the drain-pipe housing space 119, and then extends downward and outward in the vehicle width direction within the drain-pipe housing space 119, so that the lower-end outlet 101b is located on the inner side of the guide 115.

Specifically, the drain pipe 101 is passed through between the tank cover 45 and the front-rear extending portion 50a of the shroud 52, so that the outlet 101b is placed in the drain-pipe housing space 119 between the tank cover 45 and the front-rear extending portion 50a.

In this manner, the drain pipe 101 is placed within the drain-pipe housing space 119 to be entirely hidden from the outside. As a result, the drain pipe 101 can be hidden by a simple structure to achieve enhanced exterior appearance.

The outlet 101b at the lower end of the drain pipe 101 is also placed between the tank-cover side portion 45c and the front-rear extending portion 50a of the shroud 52 to be hidden from the outside. As a result, an enhancement in exterior appearance is enabled by hiding the outlet 101b in a simple structure. Further, for the drain pipe 101, the outlet 101b at the lower end is covered with the front-rear extending portion 50a of the shroud 52 to be prevented from extending more downward than the front-rear extending portion 50a. Because of this, the overall length of the drain pipe 101 can be shortened.

In addition, the overall drain pipe 101 is placed on the upper side of the flange 71 of the tank body 60. As a result, the flange 71 is out of the way of the placement of the drain pipe 101, so that the drain pipe 101 can be placed with efficiency.

The upper end portion of the drain pipe 101 is restricted in position by the opening 114 because of a passage through the opening 114. Because of this, accurate positioning can be effected for the position of the drain pipe 101.

The outlet 101b of the drain pipe 101 is covered from below within the drain-pipe housing space 119 by the lower wall 118 of the guide 115. This enables the outlet 101b to be hidden by the guide 115. As a result, an enhancement in exterior appearance can be provided.

Fuel N collected in the tray 100 (FIG. 6) flows from the upper-end opening 101a into the drain pipe 101, and then flows downward from the outlet 101b to be received by the lower wall 118 of the guide 115.

The fuel N received by the lower wall 118 further flows downward from the outer end 118a to be received by the rib 117 of the shroud 52. Then, the fuel N flows downward from the inner edge 117a of the rib 117. The fuel N falling downward from the inner edge 117a flows on the inside of the cover 47 and the outside of the main frame 15 in the vehicle width direction to be discharged downward to the outside.

In this manner, a drain pathway for the fuel to be discharged from the drain pipe 101 can be guided by the guide 115 and the rib 117 to provide smooth discharge of the fuel N. This enables prevention of the drained fuel N from adhering to another component.

Referring to FIG. 10 to FIG. 12, the left and right sides of the tank cover 45 are secured to the side-cover mounts 72, 72 by the side-cover fixation bolts 46a, 46a that are inserted through the holes 112, 112. Specifically, the tank cover 45 and the shroud 52 are co-clamped by the side-cover fixation bolts 46a, 46a.

Referring to FIG. 9 to FIG. 11, the mounting portion 113 of the front end portion of the tank cover 45 overlaps the front stay 61 of the fuel tank 40 from above, and the mounting portion 113 is secured to the front tank fixation portion 73 of the body frame F by the tank fixture 75 that is inserted through the hole 113a. Specifically, the front end portion of the tank cover 45 and the fuel tank 40 are co-clamped by the tank fixture 75.

Referring to FIG. 9 and FIG. 10, the rear end portion of the tank-cover upper surface portion 45a is covered from above with the front end portion of the seat 13, so that the rear end portion is held between the seat 13 and the upper surface 60a of the tank body 60.

The fuel sump 65 has the rear extension 102 pressed from above by the reinforcing ribs 111 on the rear end portion of the tank-cover upper surface portion 45a, so that the fuel sump 65 is held between the tank cover 45 and the upper surface 60a of the tank body 60. This enables the fuel sump 65 to be secured by a simple structure.

As described above, according to embodiments to which the present invention is applied, the motorcycle 1 includes: the fuel tank 40 that is supported by the body frame F; the filler opening 63 that is provided in the upper surface of the fuel tank 40; the tank cover 45 that covers the upper surface of the fuel tank 40; the fuel sump 65 that collects fuel overflowing from the filler opening 63; and the shroud 52 that covers the sides of the fuel tank 40. The fuel sump 65 is placed around the filler opening 63 and under the tank cover 45. The fuel sump 65 includes the drain pipe 101 through which the fuel is drained downward. The drain pipe 101 extends between the tank cover 45 and the shroud 52.

With this configuration, the drain pipe 101 of the fuel sump 65 can be hidden between the tank cover 45 covering the upper surface of the fuel tank 40 and the side surface of the fuel tank 40. Because of this, an enhancement in exterior appearance can be provided by a simple structure of hiding the drain pipe 101.

The tank cover 45 also includes the tank-cover side portion 45c as an overlap portion which is covered with the shroud 52 from outside the vehicle body. The drain pipe 101 passes through the opening 114 formed in the tank-cover side portion 45c and then extends between the tank cover 45 and the shroud 52. With this configuration, the drain pipe 101 can be held and positioned by virtue of the opening 114 formed in the tank-cover side portion 45c. Also, the opening 114 can be covered with the shroud 52 to achieve enhanced exterior appearance.

Also, the outlet 101b of the drain pipe 101 is placed between the tank cover 45 and the shroud 52. By virtue of this, the outlet 101b of the drain pipe 101 is hidden between the tank cover 45 and the shroud 52, and this results in fine exterior appearance. Also, since the entire drain pipe 101 including the outlet 101b can be housed in between the tank cover 45 and the shroud 52, the length of the drain pipe 101 can be reduced.

Moreover, the tank cover 45 includes the guide 115 extending toward the shroud 52. The guide 115 overlaps the underside of the outlet 101b. With this configuration, the fuel drained from the outlet 101b can be guided toward the shroud 52 by the guide 115 of the tank cover 45, so that the flow of fuel drained can be adjusted.

The shroud 52 also includes the rib 117 extending toward the inside of the vehicle body. The rib 117 is located under the drain pipe 101. With this configuration, the shroud 52 is reinforced by the rib 117, and the fuel drained from the outlet 101b is guided by the rib 117.

Also, the outer end 118a of the guide 115 is located more outward in the vehicle width direction than the inner edge 117a of the rib 117 of the shroud 52. With this configuration, the fuel flowing downward from the guide 115 of the tank cover 45 can be received with efficiency by the rib 117 of the shroud 52, so that the fuel discharge can be guided by the rib 117.

Also, the tank cover 45 is co-clamped to the front tank fixation portion 73 through which the front end portion of the fuel tank 40 is secured to the body frame F, and the rear end portion of the tank cover 45 is covered from above with the seat 13 for an occupant. With this configuration, the seat 13 and the front tank fixation portion 73 for the fuel tank 40 can be utilized to fix the tank cover 45 in a simple structure.

Also, the front end portion of the fuel sump 65 is fixed to the upper surface of the fuel tank 40, and the rear extension 102 of the rear end portion of the fuel sump 65 is held between the tank cover 45 and the upper surface of the fuel tank 40. With this configuration, the fuel sump 65 can be secured to the fuel tank 40 in a simple structure.

Further, the fuel tank 40 has the upper half 67 and the lower half 68 that are joined together at the flange 71 which protrudes toward the outside of the fuel tank 40, and the drain pipe 101 is placed above the flange 71. With this configuration, the drain pipe 101 can be hidden from below by the flange 71 of the fuel tank 40. Since the flange 71 is also out of the way of the placement of the drain pipe 101, efficient placement of the drain pipe 101 is provided.

Further, according to embodiments to which the present invention is applied, in the motorcycle 1, the fuel tank 40 is supported by the body frame F through the rear stay 62 which is provided in the fuel tank 40. And, the rear stay 62 includes: the upper stay 81 that extends rearward from the upper surface of the fuel reservoir 70 of the fuel tank 40; and the lower stay 82 that extends rearward from the lower surface of the fuel tank 40, and the upper stay 81 and the lower stay 82 are combined with each other at the rear of the fuel reservoir 70.

With this configuration, because the rear stay 62 extends from the upper surface of the fuel reservoir 70 and the lower surface of the fuel tank 40 to be mutually combined at the rear of the fuel reservoir 70, the rigidity of the rear stay 62 is increased so that the rear stay 62 is able to support the fuel tank 40 in a firm manner. Also, since the fuel reservoir 70 is ensured between the upper stay 81 and the lower stay 82, an increase in capacity of the fuel tank 40 is achieved.

Further, the body frame F includes the pair of left and right seat frames 18, 18 supporting the seat 13 for an occupant, and the rear stay 62 is fastened to the left and right seat frames 18, 18. With this configuration, since the fuel tank 40 is supported through the rear stay 62 on the left and right seat frames 18, 18, the fuel tank 40 is firmly supported.

Further, the rear stay 62 includes the cutout 93 located between the left and right seat frames 18, 18, and the cutout 93 extends rearward. Because of this, while the rear stay 62 is shaped to reach the left and right seat frames 18, 18, the weight of the rear stay 62 can be reduced. Further, it is possible to allow the traveling air to flow rearward through the cutout 93.

Further, the rear stay 62 is formed in a V shape extending in the front-rear direction when viewed from above, and the rear stay 62 is joined to the fuel tank 40. With this configuration, it is possible to ensure an increased length of the joint of the rear stay 62 with respect to the fuel tank 40, and therefore the rear stay 62 is firmly joined. Further, it is possible to allow the traveling air to flow between the V shape of the rear stay 62.

The rear stay 62 also includes the pair of left and right fastening portions 94, 94 which are fastened to the left and right seat frames 18, 18. The cutout 93 extends forward beyond the fastening portions 94, 94, and the battery 41 and the intake port 37a of the intake system 36 are placed rearward of the fastening portions 94, 94. With this configuration, since the cutout 93 extends forward beyond the fastening portions 94, 94, the traveling air is made apt to flow in the front-rear direction by virtue of the cutout 93. This makes it possible to provide an efficient supply of the traveling air to the intake port 37a and the battery 41 which are located rearward of the fastening portions 94, 94. It is noted that at least one of the intake port 37a and the battery 41 may be placed.

Further, the base end portion of the lower stay 82 is combined with the lower surface of the fuel reservoir 70. With this configuration, since the lower stay 82 and the upper stay 81 extend rearward from the lower surface and the upper surface of the fuel reservoir 70, a vertically increase in a contact area and/or a welding length of the rear stay 62 with the tank body 60 is enabled, and therefore the rigidity of the rear stay 62 can be increased.

Also, the fuel tank 40 is of a vertical divided type having the upper half 67 and the lower half 68 joined together at the flange 71 which protrudes toward the outside of the fuel tank 40. The flange 71 includes: the upper flange 67a provided on the lower surface of the upper half 67; and the lower flange 68a provided on the upper surface of the lower half 68. The lower half 68 includes the planar portion 68b formed at the rear end portion and the planar portion 68b is flush with the lower flange 68a. The planar portion 68b and the rear end portion of the upper half 67 form the rear end portion of the fuel reservoir 70, and the lower stay 82 is combined with the lower surface of the planer portion 68b. With this configuration, since the lower stay 82 is combined with the planar portion 68b of the lower half 68, the lower stay 82 can be formed in a simple shape, and therefore the manufacturing of the fuel tank 40 is facilitated. Further, since the planar portion 68b and the rear end portion of the upper half 67 form the rear end portion of the fuel reservoir 70, the capacity of the fuel tank 40 can be increased.

It should be noted that the above-described embodiments are an aspect to which the present invention is applied, and therefore the present invention is not limited to the above-described embodiments.

In the embodiment the lower stay 82 has been described as being joined to the lower surface of the planar portion 68b of the lower half 68, but the present invention is not limited to the embodiment. For example, the rear end portion of the fuel reservoir 70 may be formed to bulge more downward than the lower flange 68a, and the lower stay 82 may be joined to the lower surface of the bulge portion.

In the above-described embodiment the side-cover front portion 50 and the cover 47 have been described as forming the shroud 52, but this is not intended to be limiting. For example, the side-cover front portion 50 and the cover 47 may be integrated together to form the shroud 52.

Further, in the above-described embodiments, the motorcycle 1 has been described as an example of the saddle riding vehicles, but the present invention is not limited to this. The present invention is applicable to a three-wheeled saddle riding vehicle having two front or rear wheels, a saddle riding vehicle having four or more wheels, and the like.

REFERENCE SIGNS LIST

1 . . . Motorcycle (saddle riding vehicle)
13 . . . Seat
40 . . . Fuel tank
45 . . . Tank cover
45c . . . Tank-cover side portion (overlap portion)
52 . . . Shroud
63 . . . Filler opening
65 . . . Fuel sump
67 . . . Upper half
68 . . . Lower half
71 . . . Flange
73 . . . Front tank fixation portion (stay)
101 . . . Drain pipe
101b . . . Outlet
102 . . . Rear extension (rear end portion)
114 . . . Opening
115 . . . Guide
117 . . . Rib
117a . . . Inner edge
118a . . . Outer end
F . . . Body frame

The invention claimed is:

1. A saddle riding vehicle, comprising:
a fuel tank that is supported by a body frame;
a filler opening that is provided in an upper surface of the fuel tank;
a tank cover that covers the upper surface of the fuel tank; and
a fuel sump that collects fuel overflowing from the filler opening,
wherein the saddle riding vehicle includes a shroud that covers a side surface of the fuel tank,
the fuel sump is placed around the filler opening and under the tank cover,
the fuel sump includes a drain pipe that discharges fuel downward,
the drain pipe extends between the tank cover and the shroud, and
the tank cover includes an overlap portion that is covered from outside a vehicle body with the shroud,
the drain pipe passes through an opening that is formed in the overlap portion, and then the drain pipe extends between the tank cover and the shroud.

2. The saddle riding vehicle according to claim 1, wherein the drain pipe has an outlet placed between the tank cover and the shroud.

3. The saddle riding vehicle according to claim 2,
wherein the tank cover includes a guide extending toward a side of the shroud, and
the guide overlaps the outlet from below.

4. The saddle riding vehicle according to claim 1,
wherein the shroud includes a rib extending toward an inside of the vehicle body, and
the rib is located under the drain pipe.

5. The saddle riding vehicle according to claim 1, wherein
the drain pipe has an outlet placed between the tank cover and the shroud,
the tank cover includes a guide extending toward a side of the shroud, and the guide overlaps the outlet from below,
the shroud includes a rib extending toward an inside of the vehicle body, and the rib is located under the drain pipe, and
the guide has an outer end located more outward in a vehicle width direction than an inner edge of the rib.

6. The saddle riding vehicle according to claim 1,
wherein the tank cover is co-clamped to a stay through which a front end portion of the fuel tank is secured to the body frame, and
the tank cover has a rear end portion covered from above with a seat for an occupant.

7. The saddle riding vehicle according to claim 1,
wherein the fuel sump has a front end portion secured to the upper surface of the fuel tank, and
the fuel sump has a rear end portion held between the tank cover and the upper surface of the fuel tank.

8. The saddle riding vehicle according to claim 1,
wherein the fuel tank has an upper half and a lower half joined together at a flange, the flange protruding toward the outside of the fuel tank, and
the drain pipe is placed above the flange.

9. A saddle riding vehicle, comprising:
a fuel tank that is supported by a body frame;
a filler opening that is provided in an upper surface of the fuel tank;
a tank cover that covers the upper surface of the fuel tank; and
a fuel sump that collects fuel overflowing from the filler opening,
wherein the saddle riding vehicle includes a shroud that covers a side surface of the fuel tank,
the fuel sump is placed around the filler opening and under the tank cover,
the fuel sump includes a drain pipe that discharges fuel downward,
the drain pipe extends between the tank cover and the shroud, and
the drain pipe has an outlet placed between the tank cover and the shroud.

10. A saddle riding vehicle, comprising:
a fuel tank that is supported by a body frame;
a filler opening that is provided in an upper surface of the fuel tank;
a tank cover that covers the upper surface of the fuel tank; and
a fuel sump that collects fuel overflowing from the filler opening,
wherein the saddle riding vehicle includes a shroud that covers a side surface of the fuel tank,
the fuel sump is placed around the filler opening and under the tank cover,
the fuel sump includes a drain pipe that discharges fuel downward,
the drain pipe extends between the tank cover and the shroud,
the shroud includes a rib extending toward an inside of the vehicle body, and
the rib is located under the drain pipe.

* * * * *

UNITED STATES PATENT AND TRADEMARK OFFICE
CERTIFICATE OF CORRECTION

PATENT NO. : 10,668,970 B2
APPLICATION NO. : 16/257308
DATED : June 2, 2020
INVENTOR(S) : Satoshi Matsushima It is certified that error appears in the above-identified patent and that said Letters Patent is hereby corrected as shown below:

On the Title Page

Item (73) Assignee:
Change "HONDA MOTOR COMPANY" to --HONDA MOTOR CO., LTD.--.

Signed and Sealed this
Fourteenth Day of July, 2020

Andrei Iancu
*Director of the United States Patent and Trademark Office*